(12) United States Patent
Karczewicz et al.

(10) Patent No.: US 6,741,648 B2
(45) Date of Patent: May 25, 2004

(54) APPARATUS, AND ASSOCIATED METHOD, FOR SELECTING AN ENCODING RATE BY WHICH TO ENCODE VIDEO FRAMES OF A VIDEO SEQUENCE

(75) Inventors: Marta Karczewicz, Irving, TX (US); Viktor Varsa, Irving, TX (US); Bindignavile Srinivas, Lowell, MA (US)

(73) Assignee: Nokia Corporation, Fspoo (FI)

( * ) Notice: Subject to any disclaimer, the term of this patent is extended or adjusted under 35 U.S.C. 154(b) by 457 days.

(21) Appl. No.: 09/844,890

(22) Filed: Apr. 27, 2001

(65) Prior Publication Data

US 2002/0090027 A1 Jul. 11, 2002

Related U.S. Application Data

(60) Provisional application No. 60/247,287, filed on Nov. 10, 2000.

(51) Int. Cl.[7] .................................................. H04N 7/12
(52) U.S. Cl. .................................................. 375/240.02
(58) Field of Search ........................ 375/240.02, 240.03, 375/240.05, 240.12, 240.13, 240.18, 240.22; 348/404.1, 419.1; 382/239; H04N 7/12

(56) References Cited

U.S. PATENT DOCUMENTS

| 5,929,916 | A | * | 7/1999 | Legall et al. |
| 6,141,380 | A | * | 10/2000 | Krishnamurthy et al. |
| 6,151,362 | A | * | 11/2000 | Wang |
| 6,278,735 | B1 | * | 8/2001 | Mohsenian |
| 6,366,614 | B1 | * | 4/2002 | Pian et al. |
| 6,385,345 | B1 | * | 5/2002 | Ribas-Corbera et al. |
| 6,493,386 | B1 | * | 12/2002 | Vetro et al. |
| 6,498,815 | B2 | * | 12/2002 | Kleihorst et al. |

* cited by examiner

Primary Examiner—Nhon Diep
(74) Attorney, Agent, or Firm—Federico Fraccaroli

(57) ABSTRACT

Apparatus, and an associated method, for selecting the encoding bit rate at which an encoder encodes selected video frames of a sequence of video frames at a video sending device. Selection is made to provide a constant-consistency quality level and constant frame rate of display of the video frames at a video receiving device. Selection of the encoding bit rate is made responsive to a targeted frame rate and allowable communication rates upon a communication channel upon which encoded representations of the video frames are to be communicated.

17 Claims, 2 Drawing Sheets

APPARATUS, AND ASSOCIATED METHOD, FOR SELECTING AN ENCODING RATE BY WHICH TO ENCODE VIDEO FRAMES OF A VIDEO SEQUENCE

This application claims the benefit of Provisional Application No. 60/247,287, filed Nov. 10, 2000.

The present invention relates generally to a manner by which to encode video data, such as a sequence of video frames of a video stream, which is to be communicated upon a bandwidth-limited communication channel. More particularly, the present invention relates to apparatus, and an associated method, by which to select the encoding rate at which to encode at least selected frames of the sequence. Selection is made to provide constant-average, bit-rate encoding, thereby to facilitate viewing of the frames of the video stream at client, or other video receiver, at a constant frame rate and a quality level of constant consistency.

BACKGROUND OF THE INVENTION

Advancements in digital communication techniques have permitted the development of new and improved types of communications. Additional advancements shall permit continued improvements in communications and communication systems which make use of such advancements.

For instance, communication systems have been proposed, and implemented, for the communication of digital video data capable of forming video frames. Video images utilized during video conferencing are exemplary of applications which can advantageously make use of digital video sequences. Video streaming applications are also exemplary of applications which make use of digital video sequences.

A video frame is, however, typically formed of a large number of pixels, each of which is representable by a set of digital bits. And, a large number of video frames are typically required to represent any video sequence. Because of the large number of pixels per frame and the large number of frames required to form a typical video sequence, the amount of data required to represent the video sequence quickly becomes large.

Video sequences, like ordinary motion pictures recorded on film, comprise a sequence of still images, and the illusion of motion is created by displaying consecutive images at a relatively fast rate. For example, the display rate are between fifteen and thirty frames per second. Because of the relatively fast frame rate, the images in consecutive frames tend to be similar. A typical scene recorded by a camera comprises some stationary elements, such as, for example, background scenery and some moving parts. The moving parts may take many different forms, for example, the face of a news reader, moving traffic, and so on. Alternatively, the camera recording the scene may itself be moving, in which case all elements of the image have the same kind of motion. In many cases, this means that the overall change between one video frame and the next is rather small. Of course, this depends on the nature of the movement, the rate of the movement, i.e., the amount of change from one frame to the next.

The general similarity between consecutive frames of the video sequence permits the implementation of encoding techniques operable to reduce the amount of information which must be communicated between a video sending device and a video receiving device to permit the viewing of the video sequence at the video receiving device.

One exemplary encoding technique performs discrete cosine transforms of at least some pixels which collectively form each video frame. Encoding of the transformed values is performed, and the encoded values are sent by the video sending device to the video receiving device. As the communication channel upon which the encoded information is communicated to the video receiving device is generally bandwidth-limited, the encoding bit rate is not permitted to exceed an encoding rate which would exceed the communication capacity of the communication channel upon which the information is to be communicated. Additionally, when information is to be buffered at the video receiving device, the amount of information sent by the video sending device to the video receiving device also must not be at a rate greater than the rate at which the video receiving device is capable to buffer, and operate upon, the information.

Various manners, as a result, have been developed to encode video frames of a video sequence to facilitate sending of the video sequence upon a bandwidth-constrained communication channel to the video receiving device in a manner to permit viewing of the sequence at the video receiving device with at least a minimal viewing quality.

One technique, referred to as a TMN5 rate control technique, controls the bitrate of a video sequence encoded. The TMN5 rate control technique selectably skips video frames so that the amount of information encoded and sent upon the communication channel does not exceed the capacity of the communication channel or the video receiving device. While frame skipping reduces the amount of the average bit-rate encoding over a sequence of frames, skipping of selected video frames in a variable manner results in jerkiness of the resultant viewing of the sequence of the video frames at the video receiving device.

When the video sequence is to be communicated pursuant to a streaming video application, the video sequence need not, and typically is not, viewed in a real-time manner. Instead, the sequence is viewed only after at least a portion of the sequence is received at a video receiving device. If advantage could be taken of the nonreal-time nature of a video streaming application, or other application in which a sequence of video frames is communicated, the ability to provide a more constant frame rate and better quality-consistency of the video sequence, when viewed would be possible.

It is in light of this background information related to the communication of a sequence of video frames between a video sending device and a video receiving device that the significant improvements of the present invention have evolved.

SUMMARY OF THE INVENTION

The present invention, accordingly, advantageously provides apparatus, and an associated method, by which to encode video data, such as a sequence of video frames of a video stream, which is to be communicated upon a bandwidth-limited communication channel.

Through operation of an embodiment of the present invention, a manner is provided by which to select the encoding rate in which to encode at least selected frames of a sequence of video frames. A constant average bit-rate encoding of selected video frames of the sequence is performed, thereby to facilitate the viewing of the frames of the video stream at a client, or other video receiver, at a constant frame rate and at a consistent quality level.

In one aspect of the present invention, the constant average bit-rate at which selected frames of the sequence video are encoded is selected responsive to the channel capacity rate permitted of the communication channel upon which encoded information is to be communicated. Selection is made of the bit-rate at which video frames are to be encoded and which video frames are to be encoded. If appropriate, selection is also mode of which frames are to be discarded. Selection of which frames to encode and which frames to discard is made to facilitate viewing of the sequence of video frames, when received at the video receiving device, of improved quality-consistency and at a uniform frame rate.

In another aspect of the present invention, selection of the average bit-rate at which the selected video frames are encoded is further made responsive to indicia associated with a buffer located at a video receiving device. The buffer indicia is formed of, for instance, an indication of a time period required to buffer a selected amount of encoded information thereat. A model of the buffer is, for instance, maintained at the video sending device, and the buffer indicia is formed by the model of the buffer. The buffer models the buffering of information at the video receiving device by monitoring the information sent by the video sending device. Through use of a buffer model, feedback need not be sent by the receiving device back to the sending device.

In another aspect of the present invention, selection of the bit-rate by which to encode the selected ones of the video frames is further responsive to feedback information indicative of the encoding actually performed by an encoder of the video sending device. Feedback arrangement permits the selection of the bit rate at which to encode the selected video frames of the sequence to be increased or decreased, responsive to the feedback information to increase, or decrease, the selected encoding bit-rate, thereby to facilitate encoding operations performed by the encoder of the video sending device.

In one implementation, an encoding bit-rate is selected to form an encoding rate by which video frames of a streaming video sequence are to be encoded. A rate controller makes the selection. The rate controller is implemented, for instance, by execution of an algorithm at a processing device which selects the encoding bit-rate by which video frames of the streaming video sequence are encoded. Selection of the encoding bit rate is made responsive to a permitted communication channel rate, a target frame rate, and indicia associated with a buffer of a video receiving device at which encoded information is to be communicated. Responsive to the calculations, the encoding bit rate is selected, and selected video frames of the streaming video sequence are encoded and sent upon the communication channel to the video receiving device. Feedback information is also provided to the rate controller. The feedback information indications provided to the rate controller include the encoding bit rate at which the video frames are actually encoded. Responsive to the feedback information, selection of subsequent encoding bit rates are increased, or decreased, as appropriate, to maintain the encoding bit rate at the selected rate.

When encoding is performed at the encoding bit rate, and in the manners of embodiment of the present invention, improved quality-consistency and improved consistency of the frame viewing rate at a video receiving device is permitted. An improved viewing experience of the streaming video, or other sequence of video frames, is thereby provided.

In these and other aspects, therefore, apparatus, and an associated method, is provided for a video device operable in a communication system to send representations of a sequence of video frames upon a communication channel. A frame bit-rate encoding value is selected at which to encode at least selected ones of the video frames of the sequence of video frames. A rate controller is coupled to receive indications of a target frame rate representative of a targeted frame rate at which the representations of the videos frames of the sequence of video frames are to be communicated upon the communication channel and indications of a communication-channel capacity rate of permissible communication rates upon the communication channel. The rate controller is operable responsive thereto for determining the bit-rate encoding value at which to encode the at least selected ones of the video frames of the sequence. The frame bit-rate encoding value is of a level to permit the representation of the sequence to be communicated at the communication-channel capacity rate.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE INVENTION

Figure 1:
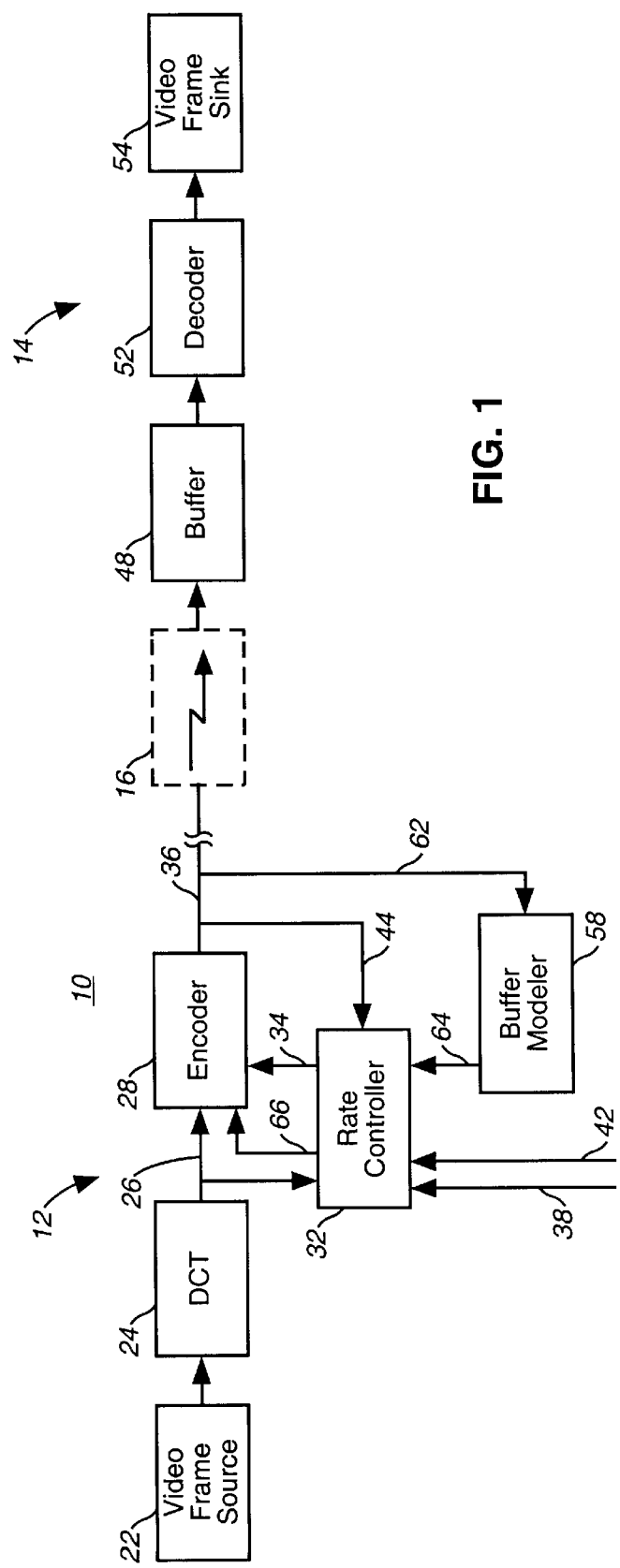
FIG. 1 illustrates a functional block diagram of a communication system operable to communicate a sequence of video frames and in which an embodiment of the present invention is operable.

Referring first to FIG. 1, a communication system, shown generally at 10, is operable to communicate a video sequence between a video sending device 12 and a video receiving device 14. Information representative the video frames of the video sequence are communicated upon a communication channel defined upon a radio link. The communication channel is here shown at 16. It should be noted at the outset that, while following descriptions shall describe operation of the communication system 10 with respect to the exemplary implementation at which the communication system forms a radio communication system and the information representative of the video frames of the sequence is transmitted upon a radio channel, the communication system, and operation of an embodiment of the present invention therein, can similarly be described with respect to a wireline communication system.

The communication channel 16 is bandwidth-limited. That is to say, the communication channel allocated for the communication of the information representative of the video frames is of a limited throughput capacity. While the throughput capacity is not necessarily fixed at a maximum, unchanging amount, the throughput capacity is potentially lesser than the capacity of the video sending device to generate and transmit information.

The sequence of video frames which are to be communicated by the video sending device 12 upon the communication channel is sourced at a video frame source 22. The video frame source is representative of, alternately, a video sequence generator or apparatus through which the video frames of the sequence are provided. Each video frame of the sequence is formed of an array of pixels, and the pixels are each represented by a series of binary values. Typically, the number of pixels in an array defining a video frame is a relatively large number, and the amount of information required to represent the pixels of a single video frame is correspondingly large. As a video sequence, such as a streaming video, generates many video frames per second, e.g., fifteen to thirty video frames per second, communication of pixel representation of each of the video frames of the sequence of video frames quickly becomes impracticably large. As noted above, various manners have been implemented to reduce the amount information required to represent a video frame, or a sequence of video frames.

Here, the video frames sourced at the source 22 are provided to a discrete cosign transformer (DCT) 24. Discrete cosign transforms are performed thereat and transformed representations of the video frames are generated on the line 16.

The transformed representations are provided to an encoder 28. The encoder is operable to encode selected ones of the video frames at a selected, encoding bit-rate.

A rate controller 32 of an embodiment of the present invention is operable to select the encoding bit rate at which the encoder is operable to encode the selected video frames provided thereto upon the line 26. The encoding bit rate selected by the rate controller is provided to the encoder by way of the line 34. Selected ones of the video frames encoded by the encoder 28 are generated on the line 36. While not separately shown, the video sending device also includes other elements to convert the encoded information representative of the selected video frames into a form to permit communication thereof upon the communication channel to the video receiving device.

The rate controller is coupled to receive indications of the communication capacity rate upon the communication channel, here represented by input indicia, applied to the rate controller on the line 38. And, the rate controller is further coupled to receive target frame rate indicia here represented by input values generated on the line 42. The target frame rate indicia is here representative of a desired rate at which to communicate video frames of a sequence of video frames to the video receiving device. In the exemplary implementation, the rate controller is further connected in a feedback arrangement by way of a feedback path 44 to provide the rate controller with indications of the encoding bit rate by which the selected video frames encoded by the encoder 28 are actually encoded.

The video receiving device is here shown to include a buffer 48. The buffer buffers information received at the video receiving device, thereafter to be decoded by a decoder 52. Once the information representative of a video frame is decoded, the video frame is displayed at a video frame sequence sink 54. Again, while not separately shown, the video receiving device also includes circuitry for converting the information communicated upon the communication channel into a form to permit buffering thereof at the buffer and decoding at the decoder.

In the exemplary implementation, the rate controller 32 is further coupled to receive indicia associated with the buffer 48. Here, a buffer modeler 58 is positioned at the video sending device 12, and the buffer modeler generates the indicia which is provided, here by way of the line 62, to the rate controller. The buffer modeler 58 is coupled to receive indications of the information sent by the video sending device upon the communication channel 16. Here, the indications are provided to the buffer modeler by way of the line 62. And, indicia formed by the buffer modeler are provided to the rate controller by way of the line 64. The buffer modeler models operation of the buffer and provide the rate controller with modeled information indication the amount of data buffered at the buffer.

The rate controller 32 is further operable to determine which video frames are encoded by the encoder 28. Video frames not selected to be encoded and sent upon the communication channel are discarded. Here, the line 66 connecting the rate controller with the encoder is representative of a path by which to identify to the encoder which frames of the video frames provided thereto should be encoded.

Figure 2:
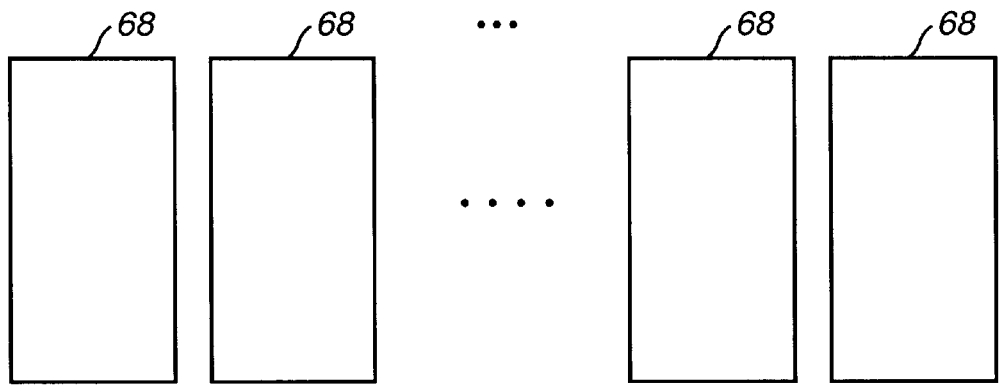
FIG. 2 illustrates an exemplary series of video frames representative of the video frames of a sequence communicated during operation of the communication system shown in FIG. 1.

FIG. 2 illustrates a representation of a plurality of the video frames 68 of a sequence 72 of the video frames. Each of the video frames is formed of an array of pixels. And each of the pixels is represented by a binary sequence. As noted with respect to FIG. 1, a discrete cosine transform is performed upon the video frames, by the discrete cosine transformer such that the video frames are represented by transformed values of the array of pixels. Encoding of the selected frames by the rate by the encoder is performed either on an intraframe bases or an interframe basis. Encoded frames utilizing intraframe encoding or compression are sometimes referred to as I-frames, and frames encoded on an interframe basis are sometimes referred to as P-frames.

The rate controller 32 of an embodiment of the present invention, in the exemplary implementation, is formed of an algorithm executable at a processing device. The encoding bit-rate selected by the rate controller permits viewing of the sequence at a constant frame rate and at a constant quality consistency within a group of video frames at the video receiving device.

In exemplary operation, encoding of the video sequence is performed first off-line, and, then, the resultant bit stream is then streamed in real-time to the video receiving device by way of a communication channel which exhibits a selected channel bandwidth. The buffer 48 of the video receiving device is of a buffer size permitted storage thereat of at least several video frames, and decoding at the video receiving device is delayed to permit a several-frame latency. Additionally, the average encoded bit rate equals the allocated channel bandwidth. Frames of varying complexity, in., coding difficulty, are compressed to different numbers of bits through operation of the encoder to provide for constant viewing quality. Therefore, transmission of video frames encoded with fewer, or more, bits requires shorter, or a longer, duration on a constant bit rate channel.

Video frames encoded by the encoder utilizing the encoding bit rate selected by the rate controller provides encoded video frames which exhibit a constant average bit-rate, measured over a selected window size, while permitting substantial instantaneous bit-rate variations. A "constrained" variable bit rate video stream formed as a result, provides a uniform viewing experience within the group of video frames.

The input values provided to the rate controller providing indication of the target frame transmission rate and the relative difficulty of all of the video frames can be calculated by the number of bits to be assigned to each frame, while achieving the goal of constant-consistency quality as well as avoiding buffer under flow or over flow of the buffer at the video receiving device. The feedback information provided by way of the feedback path to the rate controller permits recalculation of the target number of encoding bit rate for subsequent frames to be provided to the encoder within a temporal window responsive to values of the feedback information.

When implemented as an algorithm, the relative difficulty measures associated with each video frame to be encoded is provided to the rate controller by way of the line 36. The frame difficulty level, D, can be obtained, for example, as the proportion of bits spent on encoding a frame relative to that for the entire segment of W frames encoding with a fixed quantization parameter QP ($D_i$) as follows:

$$QP\left(D_i = \frac{Bits_i}{\sum_{j=1}^{W} Bits_j}\right) \quad \text{Equation 1}$$

wherein $Bits_i$ is the number of bits generated by encoding frame number I with a constant quantization parameter. Additional input parameters are designated as follows:

| | |
|---|---|
| $B_{max}$ | decoder buffer size [in bits] |
| L | decoder buffer latency [in sec]. Decoding is delayed by this time after arrival of this first byte of the stream into the decoder buffer. Note that L must be at least as large as the time taken to transmit the complete I frame |
| R | transmission channel rate [in bits/sec]. It is assumed that the average rate that we want to achieve for the sequence (or segment) is also equal R. |
| F | target frame rate [in frames/sec] |

During initialization, the decoder buffer latency L is negotiated externally and is given as an input parameter or alternately is determined byadaptively utilizing the buffer size $B_{max}$ and a target average buffer occupancy as constraints. The decoder of the video receiving device and the encoder of the video sending device utilize the same value L to ensure that the information buffered at the buffer are matched.

The number of bits to be allocated to each of the frames, $T_i$ in the sequence, or segments, is calculated as a function of the relative frame difficulty, while restricting $T_i$ only if buffer underflow or overflow occurs. The target and frame calculation procedure utilizes the following input variables:

| | |
|---|---|
| FN | current frame number |
| $FN_{last}$ | last frame number in the sequence (or segment) |
| $R_{left}$ | number of bits remaining for encoding the sequence (or segment) |
| $B_{FN-1}$ | decoder buffer level before decoding current frame [in bits] | and the output variable:

| | |
|---|---|
| $T_i$ | target number of bits to be used to encode frame "i". Calculated for all frames of the sequence (or segment). $T_{FN}$ for the current frame is the return value of targetBits. |

Values of an estimated buffer level and safety margin are utilized to account for poor matching of the target bits for a frame by the encoder. In the absence of a safety margin, although the calculated $T_i$ value may not buffer underflow or overflow, the actual number of bits after encoding, $A_i$ might. Experimental indications of mix matches indicate that mix matching is typically not much greater than 0.75 over interframe compression encoding and 0.1 for intraframe compressing encoding.

Exemplary algorithmic implementation of an exemplary embodiment as is follows:

```
TargetBits (FN, FN_last, R_left, B_FN-1)
{
    bufferSizeViolation=1;
    λ=1;
    B̂_FN-1 = B_FN-1;
    while (bufferSizeViolation==1) {
        // Calculation of the bits per frame
        for (j = FN; J<FN_last; j++__ {
            Tj = (1 – λ)R/F + λ  R_left D_j
                                ─────────
                                FN_last
                                 ?   D_k
                                k=j
        }
```

```
        // Estimated buffer level calculations to check
        violation
        bufferSizeViolation=0;
        for (j=FN; J<FN_last; j++) {
            B̂_j = B̂_j-1 – T_j + R/F;
            // safetyMargin to account for mismatch of
            actual & target
            // a minimum mismatch of 75% is assumed
            safetyMargin=0.75*T_j;
            if (B̂_j < safetymargin or B̂_j > B_max – safetyMargin)
            {
                bufferSizeViolation=1;
                break;
            }
        }
        λ = λ –0.1;
    } // end while
}
```

Adaptive operation of the selection of the encoding bit rate by the rate controller utilizes the information provided by way of the feedback path. Before encoding a frame, the target bits/frame is calculated for the current frame. The encoder then tries to match this target bit count for the current frame. After encoding, the actual number of bits utilized to encode the current video frame is used to calculate the actual decoder buffer level which is provided as an input to the target bits/frame calculation performed by the rate controller for the subsequent frame. An algorithmic implementation of the exemplary implementation by which to perform adaptive encoding is as follows:

```
R_left += Fn_last* (R/F) ;
for (i=0; i<Fn_last; i++) {
    // calculate target bits T_i for the current frame
    T_i = targetBits (i, Fn_last, R_left, B_i-1)
    // encode current frame with the target bits T_i;
    // returns actual number of bits used A_i
    A_i = encodeFrame (i, T_i);
    // decoder buffer level calculation
```

-continued

```
    B_i= B_{i-1} - A_i + R/F;
    R_left -= A_i;
}
```

An entire sequence of video frames needs not to be treated as a single segment. Instead, frames within a scene can be considered as a single segment for which an uniform viewing experience is to be provided at the target average bit rate. For a given target bit rate, the bit budget, $R_{left}$ for the duration of the segment is calculated. By meeting the bit budget, the target average bit rate is insured over the segment. If, conversely, the bit budget of the segment is exceeded even though remaining uncoded frames are in the segment, the value of $T_j$, the target number of bits per frame, is calculated for the remaining frames.

Matching of the calculated target number of bits in a frame with the actual number of bits is provided. In intraframe compression encoding, the bit counts for an intraframe should be estimated by using a bit count =f(QP) equation where QP is the fixed quantization parameter value used for the whole frame. A linear relationship between the quantization parameter and the estimated encoded bit count is as follows:

$$T=(a/QP)+b$$

The values of constants a and b have to be found for each individual intraframe e.g. through observing bit count while encoding with two different QPs.

Figure 3:
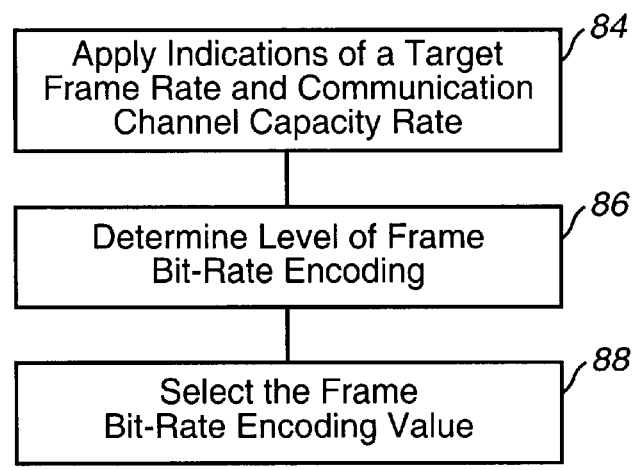
FIG. 3 illustrates a method flow diagram listing the method of operation of an embodiment of the present invention.

FIG. 3 illustrates a method, shown generally at 82, of an embodiment of the present invention. The method 82 selects a frame bit-rate encoding value at which to encode selected ones of video frames of a sequence video frames.

First, and as indicated by the block 84 indications of a target frame rate representative of a targeted frame rate and indications of a communication channel capacity rate are applied to a rate controller. Then, and as indicated by the block 86, a determination is made of a level of the frame bit-rate encoding value at which to permit the representations of the sequence to be communicated at the communication channel capacity rate is made. And, as indicated by the block 88, the frame bit-rate encoding value is selected.

Thereby a manner is provided by which to encode the video data which is to be communicated upon a bandwidth-limited communication channel. Selection is made to provide a constant average bit-rate of encoding, thereby to facilitate viewing of the frames at a constant frame rate and at a constant consistency of quality.

The previous descriptions are of preferred examples for implementing the invention, and the scope of the invention should not necessarily be limited by this description. The scope of the present invention is defined by the following claims.

What is claimed is:

1. In a video device operable in a communication system to send representations of a sequence of video frames upon a communication channel, an improvement of apparatus for selecting a frame bit-rate encoding value at which to encode at least selected ones of the video frames of the sequence of video frames, said apparatus comprising:

a rate controller coupled to receive indications of a target frame rate representative of a targeted frame rate at which the representations of the video frames of the sequence of video frames are to be communicated upon the communication channel and indications of a communication channel capacity rate of permissible communication rates upon the communication channel, said rate controller operable responsive thereto for determining the frame bit-rate encoding value at which to encode the selected ones of the video frames of the sequence, the frame bit-rate encoding value of a level to permit the representations of the sequence to be communicated at the communication channel capacity rate and said rate controller for selecting which video frames of the sequence of video frames form the at least selected ones of the video frames to be encoded at the frame bit-rate encoding value, the video frames selected by said rate controller positioned at periodic spacings in the sequence of video frames.

2. The apparatus of claim 1 wherein the representations of the sequence of video frames sent by the video device upon the communication channel are sent to a video receiver, the video receiver including a buffer for buffering values of the representations of the sequence at the video receiver, wherein said rate controller is further coupled to receive indications of a buffer characteristic of the buffer of the video receiver, and wherein the frame bit-rate encoding value determined by said rate controller is further responsive to the indications of the buffer characteristic of the buffer of the video receiver.

3. The apparatus of claim 2 wherein the indications of the buffer characteristics to which said rate controller is coupled to receive comprise indications of an initial buffer delay period corresponding to a period required initially to buffer a selected amount of the values representative of the sequence of video frames thereat.

4. The apparatus of claim 3 further comprising a video-receiver buffer modeler positioned at the video device and coupled to said rate controller, said video-receiver buffer modeler for modeling operation of the video-receiver buffer and for generating the indications of the initial buffer delay period to which said rate controller is coupled to receive.

5. The apparatus of claim 1 further comprising an encoder coupled to receive frame bit-rate encoding values determined by said rate controller and coupled to receive the sequence of video frames, said encoder for encoding the at least selected ones of the video frames of the sequence at a bit rate responsive to the bit-rate encoding value.

6. The apparatus of claim 5 further comprising a feedback path formed between said encoder and said rate controller, said feedback path for providing indications of actual-encoded bit rates at which the at least selected ones of the video frames of the sequence are encoded to said rate controller.

7. The apparatus of claim 6 wherein the frame bit-rate encoding value formed by said rate controller is further responsive to values of the indications of the actual-encoded bit rates provided to said rate controller upon said feedback path.

8. The apparatus of claim 5 wherein the sequence of video frames to which said encoder is coupled to receive comprise transformed pixel representations of the video frames.

9. The apparatus of claim 5 wherein the representations of the sequence, once encoded by said encoder, are communicated upon the communication channel at a fixed frame rate.

10. The apparatus of claim 9 wherein at least one frame of the sequence is represented by intra-frame compression thereof.

11. The apparatus of claim 9 wherein at least one frame of the sequence is represented by inter-frame compression indicating differences between the at least one frame and another frame of the sequence.

12. The apparatus of claim 1 wherein the sequence of video frames comprises a plurality of sequence-portions, and wherein said rate controller determines, separately for each sequence-portion, the frame bit-rate encoding value.

13. In a method for sending representations of a sequence of video frames from a video device operable in a communication system upon a communication channel, an improvement of a method for selecting a frame bit-rate encoding value at which to encode at least selected ones of the video frames of the sequence of video frames, said method comprising:

applying indications of a target frame rate representative of a targeted frame rate at which the representations of the video frames of the sequence of video frames are to be communicated upon the communication channel and indications of the communication channel to a rate controller;

determining, at the rate controller, a level of the frame bit-rate encoding value at which to permit the representations of the sequence to be communicated at the communication-channel capacity rate;

selecting the frame bit-rate encoding value determined during said operation of determining to permit the representations of the sequence to be communicated at the communication capacity rate;

selecting, at the rate controller, which video frames of the sequence of video frames form the at least selected ones of the video frames to be encoded at the frame bit-rate encoding value, the video frames selected being positioned at periodic spacings in the sequence of video frames.

14. The method of claim 13 comprising the further operation of providing the frame bit-rate encoding value to an encoder.

15. The method of claim 14 further comprising the operation of encoding selected ones of the video frames at an encoding rate responsive to the frame bit-rate encoding value.

16. The method of claim 15 further comprising the operation of sending the representations of the sequence of video frames upon the communication channel.

17. The method of claim 13 further comprising the operation of providing indications of actual-encoded bit rates at which the selected ones of the video frames of the sequence are encoded to the rate controller.

\* \* \* \* \*